(12) United States Patent
Choi

(10) Patent No.: US 9,537,543 B2
(45) Date of Patent: Jan. 3, 2017

(54) TECHNIQUES TO SIMULTANEOUSLY TRANSMIT AND RECEIVE OVER THE SAME RADIOFREQUENCY CARRIER

(75) Inventor: Yang-Seok Choi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 55 days.

(21) Appl. No.: 13/976,423

(22) PCT Filed: Dec. 20, 2011

(86) PCT No.: PCT/US2011/066181
§ 371 (c)(1),
(2), (4) Date: Jul. 28, 2014

(87) PCT Pub. No.: WO2013/095386
PCT Pub. Date: Jun. 27, 2013

(65) Prior Publication Data
US 2014/0376416 A1     Dec. 25, 2014

(51) Int. Cl.
| | | |
|---|---|---|
| *H04B 7/015* | (2006.01) | |
| *H04B 3/23* | (2006.01) | |
| *H04L 5/14* | (2006.01) | |
| *H04B 1/525* | (2015.01) | |

(52) U.S. Cl.
CPC ............ *H04B 7/015* (2013.01); *H04B 1/525* (2013.01); *H04B 3/23* (2013.01); *H04L 5/14* (2013.01)

(58) Field of Classification Search
CPC ............ H04B 3/23; H04B 7/015; H04L 5/14; H03H 21/0012; H03H 21/0001
USPC ........................................................ 370/277
See application file for complete search history.

(56) References Cited

U.S. PATENT DOCUMENTS

| | | | |
|---|---|---|---|
| 6,963,643 B1 | 11/2005 | Lilliott | |
| 7,916,671 B1 * | 3/2011 | Zortea | H04L 27/362 370/286 |
| 8,019,028 B1 * | 9/2011 | Zortea | H04L 1/20 327/310 |
| 8,055,235 B1 * | 11/2011 | Gupta | H04B 1/525 455/296 |
| 8,135,339 B2 | 3/2012 | Ranson et al. | |

(Continued)

FOREIGN PATENT DOCUMENTS

| | | |
|---|---|---|
| JP | 2005253058 | 9/2005 |
| JP | 2007281592 | 10/2007 |
| JP | 2010022009 | 1/2010 |

OTHER PUBLICATIONS

International Search Report and Written Opinion, Mailed Date: May 22, 2012, Application No. PCT/US2011/066181, Filed Date: Dec. 20, 2011, pp. 9.

(Continued)

*Primary Examiner* — Luat Phung
*Assistant Examiner* — Saad A Waqas

(57) ABSTRACT

An apparatus may include an antenna and a transceiver coupled to the antenna, the transceiver including a receiver operative to receive a radio-frequency (RF) signal and a transmitter operative to transmit a RF signal. The apparatus may also include an RF echo cancellation module coupled to the receiver and the transmitter, the RF echo cancellation module operative to generate an analog echo cancellation signal for the received RF signal based on a delayed version of the transmit RF signal. Other embodiments are disclosed and claimed.

16 Claims, 10 Drawing Sheets

(56) References Cited

U.S. PATENT DOCUMENTS

| | | |
|---|---|---|
| 8,170,470 B2 | 5/2012 | Park et al. |
| 8,280,037 B2 | 10/2012 | Takada |
| 2004/0114542 A1* | 6/2004 | Stopler ................. H04M 9/082 370/286 |
| 2005/0069063 A1 | 3/2005 | Waltho et al. |
| 2005/0099967 A1* | 5/2005 | Baba ........................ H04B 3/32 370/286 |
| 2005/0163249 A1* | 7/2005 | McCallister ...... H04L 25/03343 375/296 |
| 2006/0267734 A1* | 11/2006 | Taki ..................... G06K 7/0008 340/10.4 |
| 2007/0194886 A1 | 8/2007 | Bang et al. |
| 2009/0130981 A1 | 5/2009 | Nagai et al. |
| 2010/0226492 A1 | 9/2010 | Takada |
| 2011/0134810 A1 | 6/2011 | Yamamoto et al. |
| 2011/0176688 A1 | 7/2011 | Sugiyama |
| 2012/0252382 A1* | 10/2012 | Bashir ..................... H03F 3/217 455/114.3 |
| 2013/0040555 A1* | 2/2013 | Rimini ................... H04B 1/525 455/1 |
| 2013/0102254 A1* | 4/2013 | Cyzs ...................... H04B 1/126 455/63.1 |

OTHER PUBLICATIONS

Office Action received for Japanese Patent Application No. 2014-548752, mailed Apr. 21, 2015, 9 pages including 5 pages English translation.

Office Action received for Chinese Patent Application No. 201180075745.9, mailed Jan. 4, 2015, 25 pages including 15 pages English translation.

Extended European Search Report received for European Patent Application No. 11878164.0, mailed Jul. 17, 2015, 6 pages.

Office Action received for Chinese Patent Application No. 20118007574.5, mailed Mar. 15, 2016, 5 pages (untranslated).

* cited by examiner

900

---

Output Signal to be Transmitted (Tx) over a First Frequency Range as $x(t) = x_i(t)\cos(\omega t) + x_q(t)\sin(\omega t)$

902

---

Receive Rx signal as y(t) over First Frequency Range
904

---

Apply Hilbert Transform to X(T) to form $\hat{x}(t)$ Where $\hat{x}(t) = x_i(t)\sin(\omega t) - x_q(t)\cos(\omega t)$
906

---

Apply Echo Cancellation Signal
$-w_{1,i}x(t-\tau_1) - w_{1,q}\hat{x}(t-\tau_1) - w_{2,i}x(t-\tau_2) - w_{2,q}\hat{x}(t-\tau_2)$
to the Received Signal y(t) to Form an Echo-Cancelled Signal z(t), Where $\tau_1$ and $\tau_2$ are Delays from a Two-Tap Filter
908

*FIG. 9*

TECHNIQUES TO SIMULTANEOUSLY TRANSMIT AND RECEIVE OVER THE SAME RADIOFREQUENCY CARRIER

BACKGROUND

Modern wireless communications systems typically employ separate time and/or frequency resources for downlinks (DL) and uplinks (UL). For example, in frequency division modulation (FDM), downlinks employ radio-frequency (RF) carriers over frequency range(s) that are different from the frequency ranges of RF carriers used for the uplinks. In time division multiplexing, such as time division duplexing (TDD), the DL and UL employ different time resources, such that uplink communications take place at different time slots or frames than downlink communications. Because of the practice of employing TDD or FDM in wireless communications, the full time/frequency capacity for conduction of wireless communications has not yet been exploited.

In order to exploit the ability to conduct simultaneous transmission (Tx) and reception (Rx) (STR) over the same frequency and time range, it may be desirable to improve present day apparatus and procedures for conducting duplex communications. For example, when Tx and Rx signals use the same RF carrier and time slot, a high power Tx signal typically leaks to the receive chain through a duplexer as an echo. The term "echo" is used to refer to an undesired feed-through of a transmitted data signal into a receiver.

In many circumstances, this high power echo may create a severe interference to what may be a very weak signal, such as a signal received from a cell edge of a radio access network. Due to impedance mismatching at an antenna and cable, echoes can appear at the receive chain. In addition, a transmitted signal can be reflected in the air and may return to a system as multiple echoes that can interfere with the weak desired receive signal. As an example, a Tx signal may be transmitted at 46 dBm. A typical duplexer may exhibit 20~40 dB leakage. Accordingly, even assuming 40 dB leakage at the duplexer, a 6 dBm echo can result to contaminate the desired (weak) receive signal. Without cancelling such STR interference caused by echoes, the intended received signal may not be decoded because the signal strength of the echo swamps the intended received signal.

It is with respect to these and other considerations that the present improvements have been needed.

BRIEF DESCRIPTION OF THE DRAWINGS

FIG. 9 depicts one exemplary logic flow.

DETAILED DESCRIPTION

Various embodiments are related to wireless apparatus and methods for two-way communications, and in particular two-way radio communications including wired communications. Some embodiments may be implemented with a radio technology such as defined in one or more specifications or standards promulgated by the Institute of Electrical and Electronics Engineers (IEEE), such as IEEE 802.11 (WiFi), IEEE 802.16 (WiMAX), IEEE 802-20, evolved UTRA (E-UTRA), and any progeny, revisions, and variants, among other standards. The IEEE 802.16m and IEEE 802.16p standards are an evolution of IEEE 802.16e, and provide backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. LTE-advance (LTE-A) is an evolution of the 3GPP LTE and may generally refer to 3GPP LTE release 1.0 and successive generations.

In various embodiments, techniques facilitate STR through the use of novel circuitry and echo cancellation techniques. In order to facilitate STR, it is possible to cancel STR interference in a transceiver in the digital baseband domain by using echo cancelling techniques such as an adaptive filter. However, as provided by the present embodiments, it may be desirable to cancel STR interference in the RF analog domain in order to avoid non-linear distortion that can occur from a low noise amplifier (LNA) that processes an incoming signal before the signal is downconverted.

Figure 1:
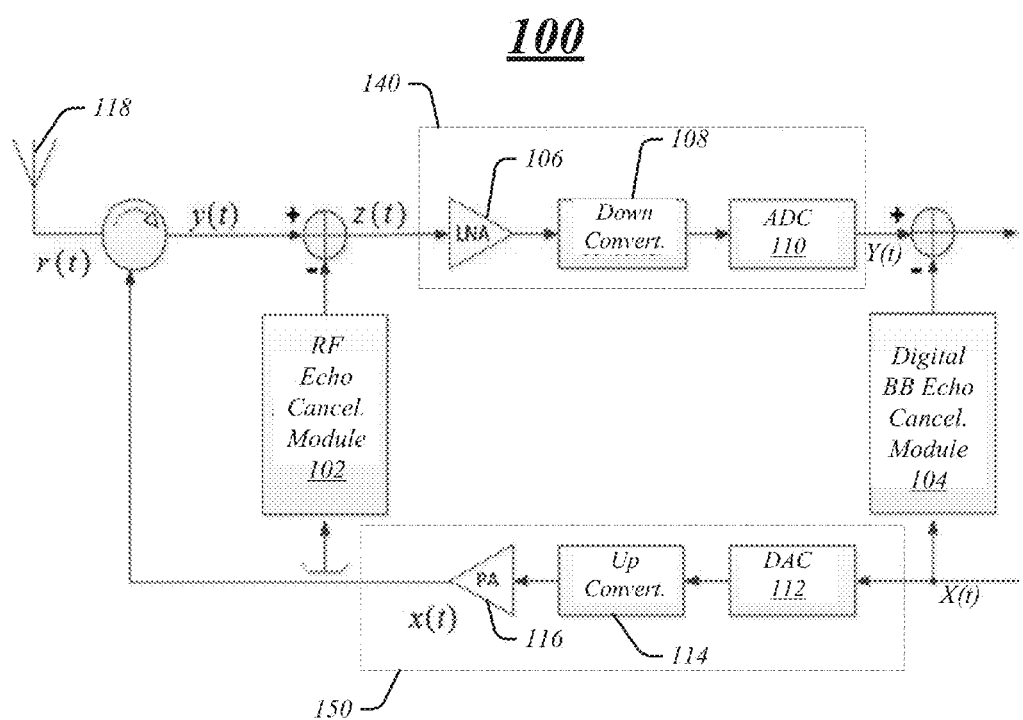
FIG. 1 depicts a system for STR communications consistent with the present embodiments.

FIG. 1 depicts a system 100 for STR communications consistent with the present embodiments that addresses the issue of analog echo cancellation. In various embodiments, the system 100 may form part of a wireless transceiver that may implement simultaneous transmission and reception of signals over the same RF carriers, that is, over the same frequency range. The system 100 may provide for both RF and baseband STR interference cancellation (STR-IC).

The system 100 includes an RF echo cancellation module 102 and a digital baseband echo cancellation module 104 that are each coupled to a receiver 140 and transmitter 150. The receiver 140 includes a low noise amplifier (LNA) 106 that is arranged to process an incoming signal from an antenna 118, and feed the processed signal to a downconverter 108, which may downconvert the incoming signal into the baseband range. The receiver 140 also includes an analog-to-digital converter (ADC) 110 to generate a digital baseband signal whose output is coupled to the digital baseband echo cancellation module 104.

The transmitter 150 includes a digital-to-analog converter (DAC) 112 that may receive a digital baseband signal X(t), which signal may also be fed to the digital baseband echo cancellation module 104 as illustrated. Using the input digital baseband signal X(t), the digital baseband echo cancellation module 104 may generate signal to apply echo cancellation to the received baseband signal Y(t). Using the same digital baseband signal X(t) the DAC 112 may generate an analog signal to be fed to upconverter 114. The upconverter 114 is arranged to upconvert the analog signal to a given RF frequency. The upconverted RF signal x(t)

may then be fed into power amplifier (PA) 116 for transmission via an antenna 118, and may additionally be fed to the RF echo cancellation module 102.

Figure 2:
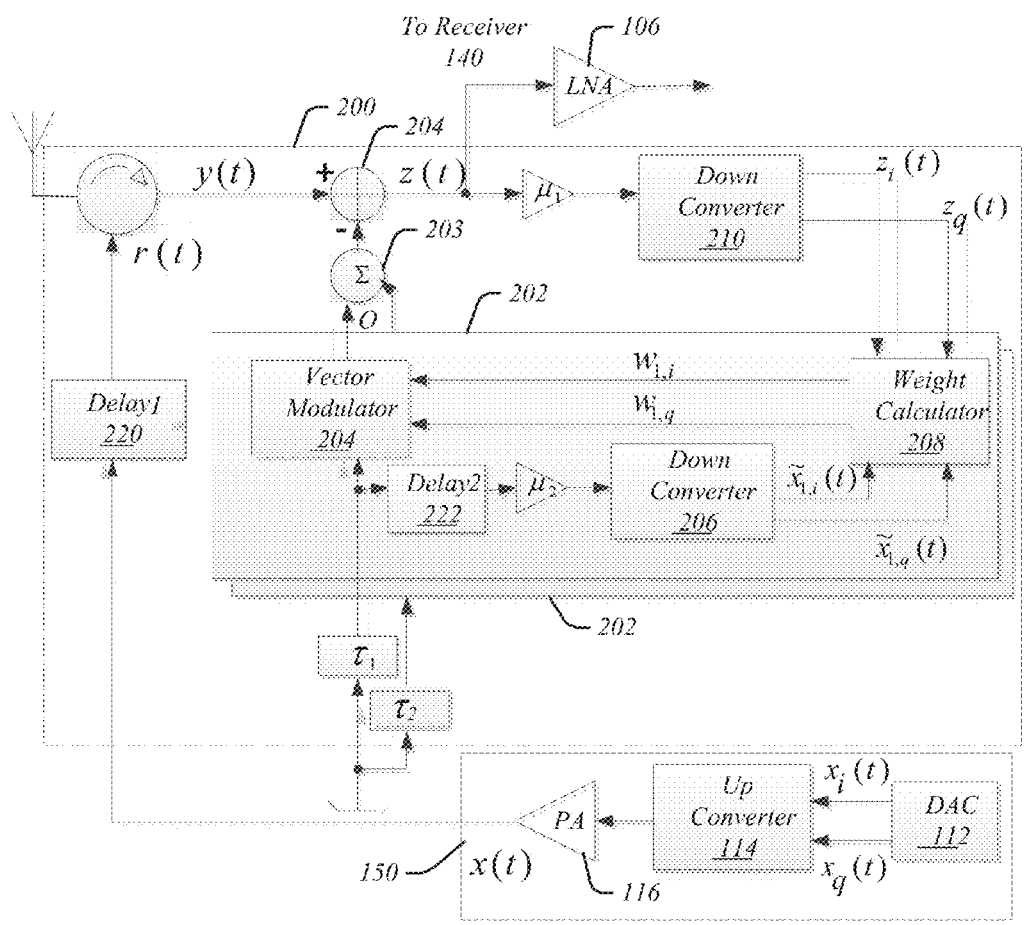
FIG. 2 provides details of an RF echo cancellation module consistent with various embodiments.

In order to improve echo cancellation performance, the RF echo cancellation module 102 may employ novel procedures to implement echo cancellation in the analog domain. FIG. 2 provides details of an RF echo cancellation module consistent with various embodiments, such as the RF echo cancellation module 202, for example. The arrangement of FIG. 2 includes an echo cancellation system 200 that includes the RF echo cancellation module 202 whose operation is detailed in the discussion to follow. Included in RF echo cancellation module 202 is a novel vector modulator 204, a downconverter 206 and weight calculator 208. Although termed an RF echo cancellation module 202, it is to be noted that some of the operations of the performed by the RF echo cancellation module 202 may be performed in the baseband regime, as described below.

In various embodiments, the echo cancellation system 200 may implement novel procedures for treating RF analog signals as well as baseband signals. Turning to treatment of an analog domain signal, the signal to be transmitted Tx can be expressed as $$x(t) = x_i(t)\cos(\omega t) + x_q(t)\sin(\omega t) \quad (1)$$

where $\omega$ is carrier frequency in rad/sec, $x_i(t)$ is in-phase baseband signal and $x_q(t)$ is quadrature-phase baseband signal.

Assuming the case of a single echo for clarity, and an unknown gain g and delay $\tau$, the received signal including echo can be expressed as $$y(t) = gx(t-\tau) + r(t) + n(t) \quad (2)$$

where r(t) is desired received signal and n(t) is noise.

Consistent with the present embodiments, the echo may be estimated and subtracted from y(t) to determine an echo canceled signal z(t). In some embodiments a multiple-tap filter may be used to perform echo estimation. In one embodiment, for example, a two-tap filter is used to estimate the echo. The two-tap filter may be provisioned with delays $\tau_1$ and $\tau_2$, from which the echo can be estimated using two weights $w_1$ and $w_2$. Consequently, the echo-cancelled signal z(t) may be written as $$z(t) = y(t) - w_{1,i}x(t-\tau_1) - w_{1,q}\hat{x}(t-\tau_1) - w_{2,i}x(t-\tau_2) - w_{2,q}\hat{x}(t-\tau_2) \quad (3)$$

where $w_{k,i}$ in-phase and $w_{k,q}$ is quadrature-phase and $\hat{x}(t)$ is a Hilbert transform of x(t), where the Hilbert transform is given by $$\hat{x} = x_i(t)\sin(\omega t) - x_q(t)\cos(\omega t) \quad (4).$$

In various embodiments, the complex baseband signal can be represented by performing a series of additional procedures as set forth below. To begin with, the baseband Tx signal can be expressed as $$X(t) = x_i(t) + jx_q(t) \quad (5)$$

In addition, the received signal including echo (Y(t)) can be expressed as:

$$Y(t) = gX(t-\tau)e^{j\omega\tau} + R(t) + N(t) \quad (6).$$

Accordingly, the echo-cancelled signal in the baseband regime Z(t) may be expressed as:

$$Z(t) = Y(t) - W_1 X(t-\tau_1)e^{j\omega\tau_1} - W_2 X(t-\tau_2)e^{j\omega\tau_2} = Y(t) - W^T X(t) \quad (7)$$

where $W_k = w_{k,i} + jw_{k,q}$ and $W = [W_1\ W_2]^T$ (8).

In the above approach a goal is to choose a weight vector W that minimizes the power of Z(t), where W may represent the weight vector for implementing a two-tap Wiener filter.

In some embodiments, a Steepest-descent method, such as a variant of widely used least mean squared (LMS) approach for echo-cancellers and adaptive filters, may then be used to derive the update equation:

$$W = W - \frac{\mu}{2}\nabla|Y(t) - W^T X(t)|^2 \quad (9)$$

where $\mu$ represents step-size.
It can be shown that $$\nabla|Y(t) - W^T X(t)|^2 = 2\frac{\partial}{\partial W^*}|Y(t) - W^T X(t)|^2 = -2X^*(t)Z(t). \quad (10)$$

Accordingly, W can be expressed in the update equation as:

$$W = W + \mu X^*(t)Z(t). \quad (11)$$

In order to implement the procedures outlined in Eqs. (1)-(11) for performing RF echo cancellation in conjunction with baseband echo cancellation, several features of the novel architecture of echo cancellation system 200 may be considered. As detailed further below, the vector modulator 204 may generate an RF analog signal to be used to provide echo cancellation in the analog domain to an incoming RF domain signal. More particularly, the vector modulator 204 of RF echo cancellation module 202 may output a signal O that is combined with the incoming received signal y(t) to yield an echo cancelled signal z(t). The form of this output signal O may be generated as set forth in Eqs. (3) and (4) above.

In order for the vector modulator 204 to generate the appropriate echo cancellation signal, the weight calculator 208 may provide weight factors, or "weights," to be applied by the vector modulator 204, as explained below with respect to FIG. 4. Additionally, in order to generate the appropriate weight factors, the weight calculator 208 may draw as inputs the downconverted signals generated by the downconverter 206 resident in the RF echo cancellation module 202, and may additionally receive downconverted echo cancelled signals generated by the downconverter 210. In turn, the downconverted signals generated by the downconverter 206 may be derived from RF domain signals that are formed by filtering the transmit signal x(t) generated by transmitter 150 and subsequently input into the downconverter 206.

As further illustrated in FIG. 2, the echo cancellation system 200 may include a delay 220 and delay 222, whose operation is described in more detail below. In brief, the delays 220 and 222 may introduce signal delays in order to align timing between different signals as the different signals propagate through different paths and are processed by different components of the echo cancellation system 200.

Figure 3:
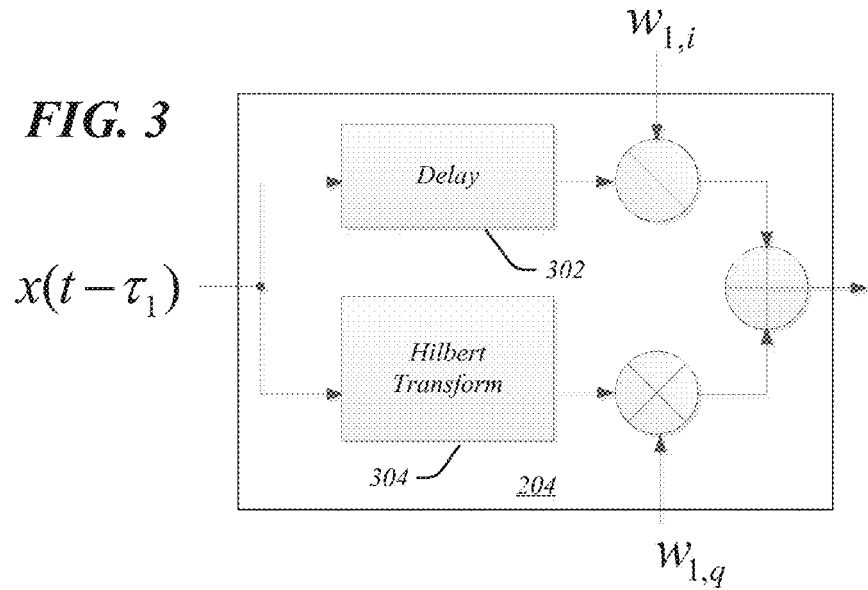
FIG. 3 provides details of the architecture of a vector modulator according to various embodiments.

Turning now to FIG. 3, there are provided details of the architecture of a vector modulator 204 according to various embodiments. In an embodiment of a two-tap filter, vector modulator 204 may therefore receive the delayed output of the Tx signal $x(t-\tau)$ for two different delays $\tau_1$ and $\tau_2$, and the in phase weight $w_i$ and quadrature phase $w_q$ weight from the weight calculator 208 for each of two different weights, $w_1$ and $w_2$. The Tx signals $x(t-\tau)$ and in phase weights $w_i$ and quadrature phase weights $w_q$ for each of the two different weights $w_1$ and $w_2$ may then be processed by the vector modulator 204 to generate the output signal O, which can be expressed as an additive combination of the multiple components: $-w_i x(t-\tau) - w_{1,q} \hat{x}(t-\tau_1) - w_{2,i} x(t-\tau_2) - w_{2,q} \hat{x}(t-\tau_2)$. These components are subsequently added to the received signal y(t) to form the echo cancelled signal z(t).

Figure 4:
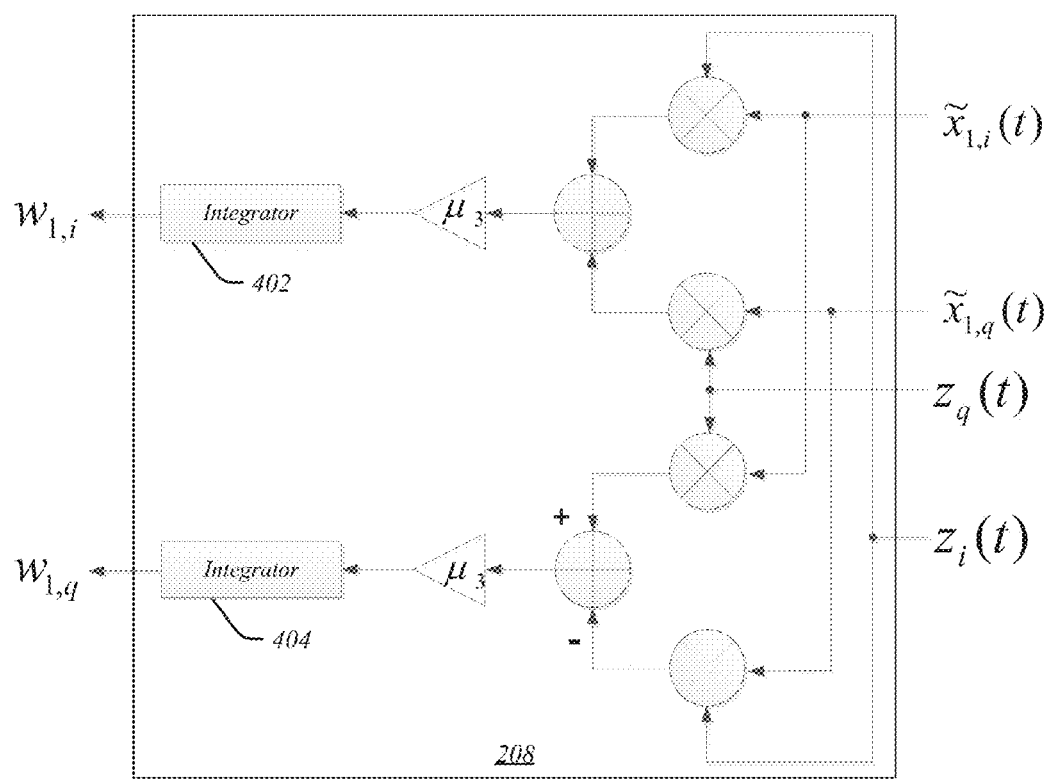
FIG. 4 depicts details of the weight calculator consistent with various embodiments.

For clarity, in the FIGS. 2-4, the details of operation that are depicted show signaling for one tap that is characterized by a first delay $\tau_1$. However, the same operations generally depicted therein apply to the second tap characterized by a delay $\tau_2$ and may produce the analogous signaling as detailed for the first tap. Returning to FIG. 3, it is shown that the vector modulator 204 may receive as an input $x(t-\tau_1)$, which represents the transmitted signal x(t) that is output by the power amplifier 116 after applying the delay $\tau_1$. The input signal $x(t-\tau_1)$ is fed in parallel into both delay module 302 and Hilbert transform module 304. The output of delay module 302 is multiplied by the in phase weight $w_{1,i}$ that is output from the weight calculator 208, discussed further below. The output of the Hilbert transform module 304 is multiplied by the quadrature-phase weight $w_{1,q}$ as illustrated in FIG. 3. The products $w_{1,i} x(t-\tau_1)$ and $w_{1,q} \hat{x}(t-\tau_1)$ are then summed. As noted, a similar procedure may be applied to an input signal $x(t-\tau_2)$ that is produced by the delay $\tau_2$ depicted in FIG. 2, with the result that the products $w_{2,i} x(t-\tau_2)$ and $w_{2,q} \hat{x}(t-\tau_2)$ are generated, summed together and output by the vector modulator 204. The sums of $w_{1,i} x(t-\tau_1)$ and $w_{1,q} \hat{x}(t-\tau_1)$ and the sums of $w_{2,i} x(t-\tau_2)$ and $w_{2,q} \hat{x}(t-\tau_2)$ may then subtracted from the received signal y(t), producing the echo cancelled signal z(t), as previously noted.

It is to be noted that the multipliers in the vector modulator 204 may not always act as a multiplier, because the loss at the coupler may be chosen to be smaller than that of the duplexer. In such a case, rather than acting as a multiplier, the multiplier in the vector modulator 204 acts as an attenuator.

FIG. 4 depicts details of the weight calculator 208 consistent with various embodiments. Referring also to FIG. 2, the downconverter 210 may output a downconverted echo canceled signal as in phase and quadrature components $z_i(t)$ and $z_q(t)$ as illustrated. These components $z_i(t)$ and $z_q(t)$ are then fed to the weight calculator module 208 in order to produce the respective in phase weight $w_i$ and quadrature phase weight $w_q$ as illustrated. In the scenario specifically depicted in FIG. 4, the components $z_i(t)$ and $z_q(t)$ are each multiplied by the in phase and quadrature downconverted Tx signals $\tilde{x}_{1,i}(t)$ and $\tilde{x}_{1,q}(t)$, respectively, which are output from downconverter 206, as depicted in FIG. 2. The products $\tilde{x}_{1,i}(t) z_i(t)$ and $\tilde{x}_{1,q}(t) z_q(t)$ are added together and incremented by step $\mu_3$ and fed through integrator 402 to form the weight $w_{1,i}$. Likewise, the products $\tilde{x}_{1,i}(t) z_q(t)$ and $\tilde{x}_{1,q}(t) z_i(t)$ are added together and incremented by step $\mu_3$ and fed through integrator 402 to form the weight $w_{1,q}$.

Figure 5:
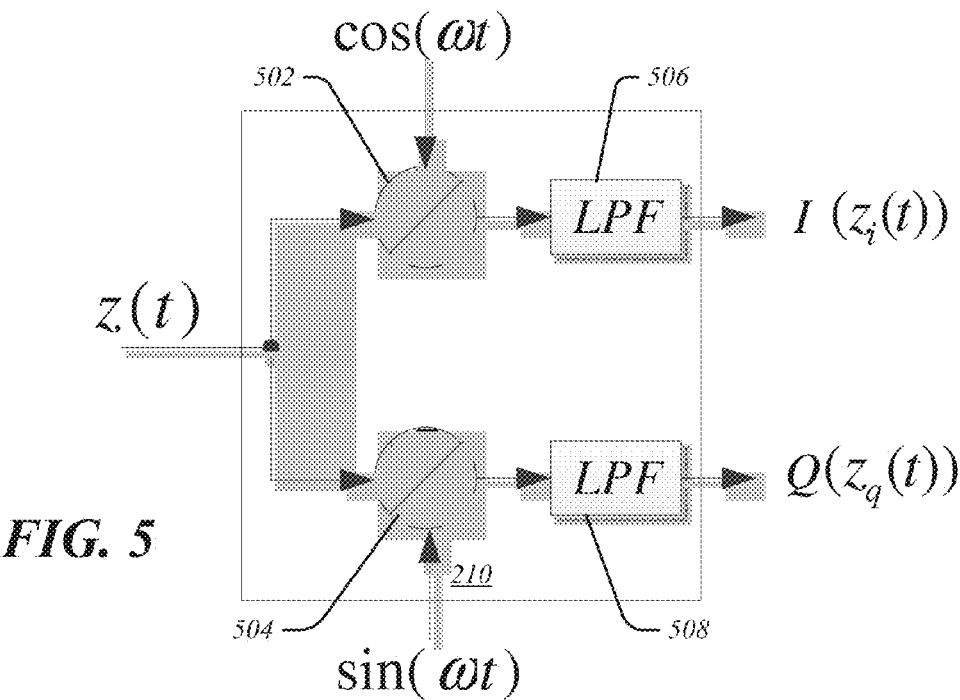
FIG. 5 depicts details of an embodiment of the downconverter.

FIG. 5 depicts details of an embodiment of the downconverter 210 as shown in FIG. 2. As illustrated in FIG. 5, the downconverter 210 is arranged to receive the incoming echo canceled signal z(t) and to provide split paths that direct the signal for multiplication. Along one path the signal z(t) is fed to the multiplier 502, which is arranged to receive a cos(ωt) signal to be multiplied by the incoming signal z(t) signal. The product may be fed through low pass filter 506, to produce an in phase signal component $z_i(t)$. Along the other path the signal is fed to the multiplier 504, which is arranged to receive a cos(ωt) signal to be multiplied by the incoming signal z(t) signal, and the product may be fed through low pass filter 508, to produce a quadrature signal component $z_q(t)$. The two components $z_i(t)$ and $z_q(t)$ may then be fed as inputs to the weight calculator 208 as described above.

Figure 6:
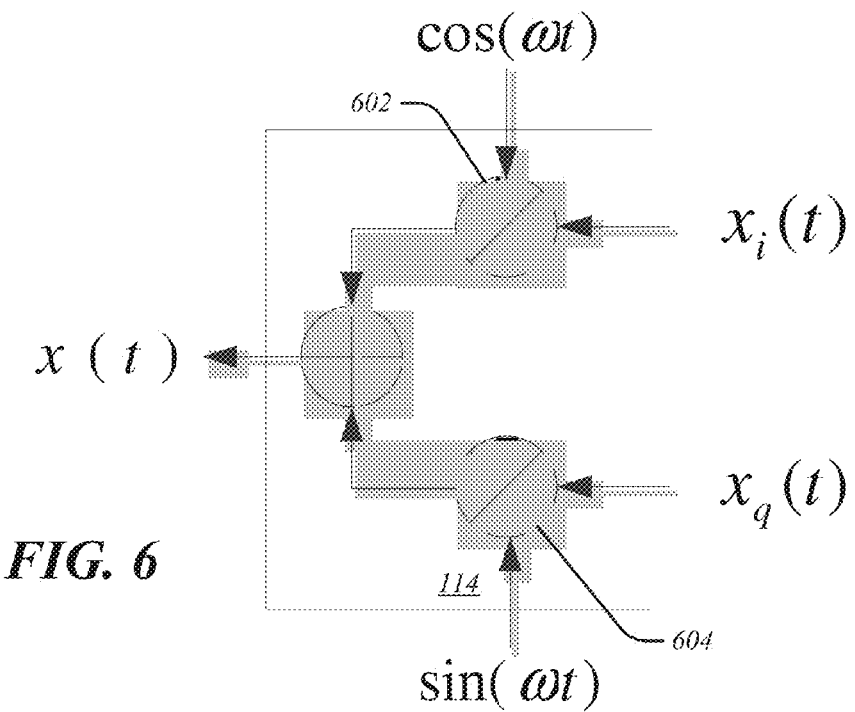
FIG. 6 depicts details of an embodiment of the upconverter.

FIG. 6 depicts details of an embodiment of the upconverter 114 as shown in FIGS. 1, 2. As illustrated, the upconverter 114 is arranged to receive the incoming in-phase baseband signal $x_i(t)$ and quadrature-phase baseband signal $x_q(t)$ that are output from the DAC 112. As illustrated, the upconverter 114 is arranged to multiply using multiplier 602 the incoming in-phase baseband signal $x_i(t)$ by a cos(ωt) signal, and multiply using multiplier 604 the quadrature-phase baseband signal $x_q(t)$ by a sin(ωt) signal, and to combine the products to output $x(t) = x_i(t) \cos(\omega t) + x_q(t) \sin(\Omega t)$.

Turning once more to FIG. 2, in order to ensure proper operation of the echo cancellation system 200, the Delay1 module 220 may be introduced in the output path to intercept the Tx signal x(t). The Delay1 module 220 may introduce a first delay interval to compensate for the delay in vector modulator 204 and the delay in adder 203, so that the duration of the unknown delay in the duplexer lies in between $\tau_1$ and $\tau_2$. Likewise, the Delay2 module 222 may be introduced in the path before the downconverter 206, such that the delay in Delay2 module 222 is equal to the sum of the delay provided by vector modulator 204, and the adder 204.

In various embodiments, the step size μ that is used to increment the baseband weight vector W can be chosen to be less than 1. In particular embodiments, the step size μ may be split into smaller components to be applied at different portions of the echo cancellation system 200. For example, as illustrated in FIG. 2 and FIG. 4, the step size μ may be split into 3 smaller values, i.e. $\mu = \mu_1 \mu_2 \mu_3$. In order to avoid a high power signal at a downconverter 206, 210 and weight calculator 208, a portion of the total step μ may thus be applied before the downconverter (e.g., $\mu_1$, $\mu_2$ for respective downconverters 210, 206). Another consideration is that not too much attenuation should be applied before the downconverter 206, 210 to avoid an excessive noise figure increase. Moreover, consistent with the present embodiments, the loss in the coupler may be arranged to not exceed the leakage in the duplexer in order to avoid amplification in the echo-regeneration path.

Figure 7:
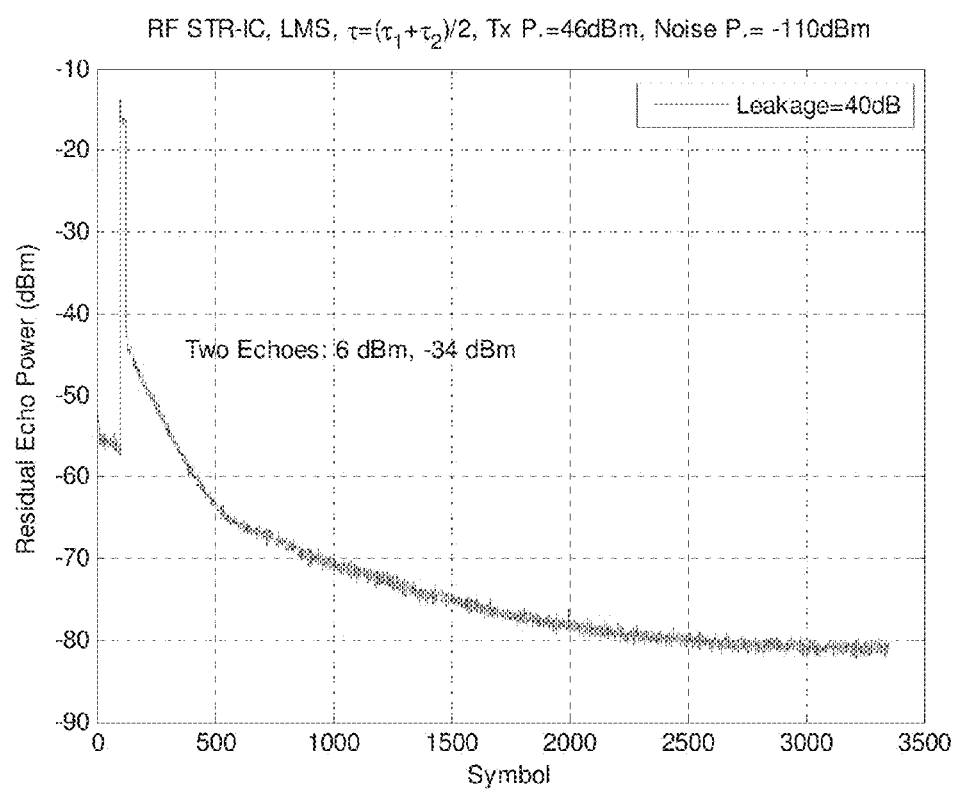
FIG. 7 illustrates the echo power results for an echo cancellation system consistent with the present embodiments.

By implementing echo cancellation in the analog domain as provided by the present embodiments, the residual echo power may be suppressed sufficiently to allow for STR technology to be implemented over the same RF carriers, thereby affording the potential to greatly increase the capacity of wireless communications systems that employ two way communications. FIG. 7 illustrates the echo power results for an echo cancellation system consistent with the present embodiments. In the example shown, the transmit power is set at 46 dBm, the noise power is −110 dBm, and two echoes are at 6 dBm and −34 dBm. The residual echo power is plotted as a function of total number of transmitted symbols. It can be seen that the total residual echo power decreases to below −80 dBm after about 2000 symbols. Assuming a value of 40 dB leakage in the duplexer and assuming a 6-Tap STR system, the echo power may be suppressed up to 127 dB (=87+40). Moreover, the residual echo may be cancelled at the digital baseband region after downconversion and analog-to-digital conversion.

In further embodiments, the residual echo may be improved by further increasing the number of filter taps used and/or by reducing the difference of absolute value of the different consecutive tap delays (i.e. $|\tau_{k+1} - \tau_k|$).

Figure 8:
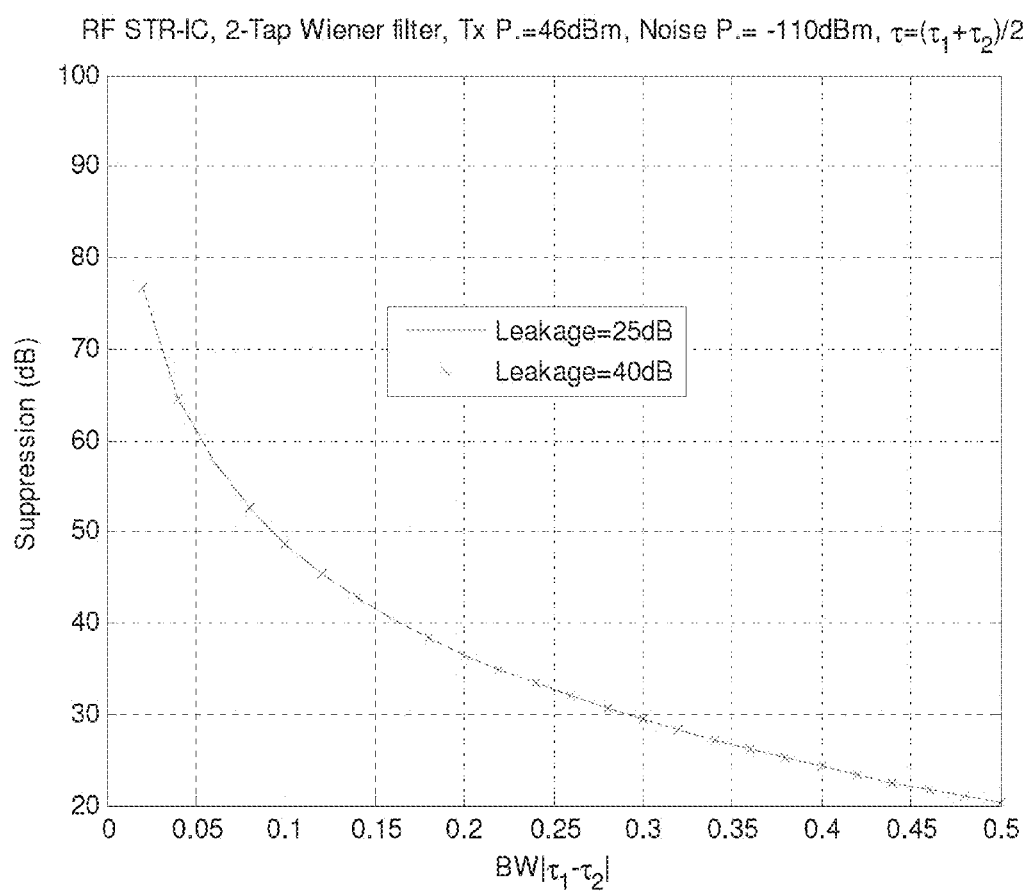
FIG. 8 presents results of echo suppression consistent with the present embodiments.

In echo cancellation apparatus arranged according to the present embodiments, it can be shown that when the delay difference in a two-tap filter system is reduced, the dB echo suppression can be significantly increased. For example, in a two-tap filter system, when the difference in the absolute value of the first and second tap delays is normalized to bandwidth (BW) used for the transmission, the dB suppression increases at values corresponding to a small delay difference between the first and second taps. FIG. 8 presents results of suppression as a function of the product BW ($|\tau_{k+1}-\tau_k|$) where k=1. A two-tap Wiener filter is employed in a scenario in which the Tx signal is 46 dBm, the noise is equal to −110 dBm. Two different curves are illustrated, which correspond to leakage values of 25 dB and 40 dB. As illustrated, the curves overlay one another such that the suppression does not exhibit dependence on the leakage value in this high echo power case. As evident, the suppression (dB) rises steeply below a value of about 0.1 BW ($|\tau_{k+1}-\tau_k|$), reaching a dB level of about 60 for a value of 0.05 BW($|\tau_{k+1}-\tau_k|$). Notably, the 0.05 value corresponds to 2.5 nanoseconds for 20 MHz bandwidth, a value which can be implemented using current technology.

As previously noted, the suppression may also be increased by increasing filter taps, which may be used in conjunction with decreases in BW($|\tau_{k+1}-\tau_k|$) to further improve suppression.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 9 depicts one exemplary logic flow 900. At block 902, a transmitter, such as the transmitter outputs a signal to be transmitted Tx over a first frequency range as $x(t)=x_i(t)\cos(\omega t)+x_q(t)\sin(\omega t)$. At block 904, a receiver, such as receiver 140 receives a signal Rx as y(t) over the first frequency range at the same time as the Tx signal is output.

At block 906, a Hilbert transform is applied to the signal derived from x(t), where the Hilbert transform for x(t) is $\hat{x}(t)=x_i(t)\sin(\omega t)-x_q(t)\cos(\omega t)$.

At block 908, an echo cancellation signal ($-w_{1,i}x(t-\tau_1)-w_{1,q}\hat{x}(t-\tau_1)-w_{2,i}x(t-\tau_2)-w_{2,q}\hat{x}(t-\tau_2)$) is added to the received signal y(t) to from an echo-cancelled signal z(t), where $\tau_1$ and $\tau_2$, represent delays from a two-tap filter, from which the echo can be estimated using two weights $w_1$ and $w_2$, where $w_{k,i}$ is in-phase and $w_{k,q}$ is quadrature-phase and $\hat{x}(t)$ is the Hilbert transform of x(t).

Figure 10:
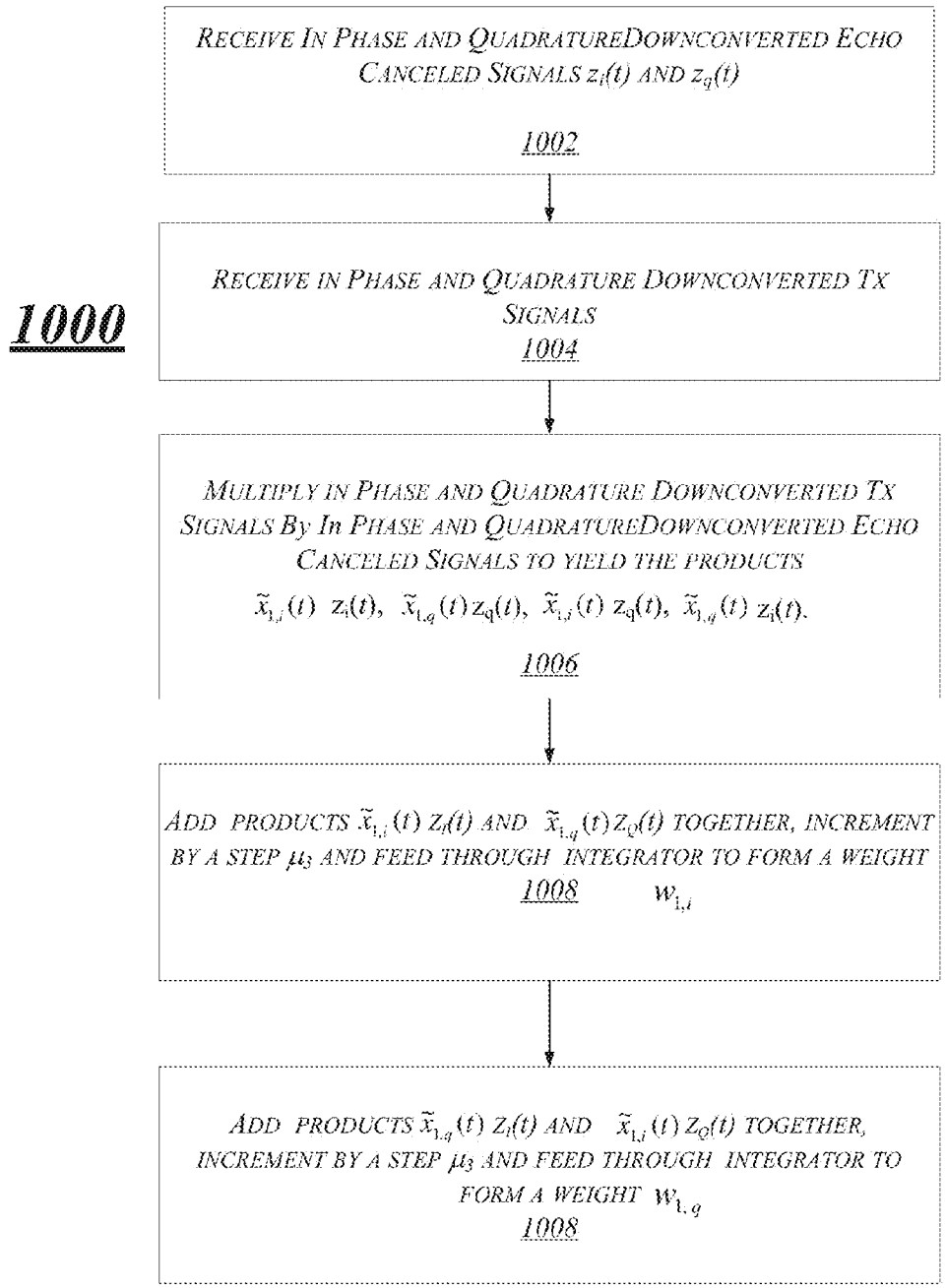
FIG. 10 depicts another exemplary logic flow.

FIG. 10 depicts another exemplary logic flow 1000. At block 1002, a weight calculator, such as the weight calculator 208 receives in phase and quadrature downconverted echo canceled signals $z_i(t)$ and $z_q(t)$. At block 1004, the weight calculator receives in phase and quadrature downconverted Tx signals $\tilde{x}_{1,i}(t)$ and $\tilde{x}_{1,q}(t)$.

At block 1006, the weight calculator multiplies the in phase and quadrature downconverted Tx signals by the in phase and quadrature downconverted echo canceled signals to yield the multiple products $\tilde{x}_{1,i}(t) z_i(t)$, $\tilde{x}_{1,q}(t) z_q(t)$, $\tilde{x}_{1,i}(t) z_q(t)$, and $\tilde{x}_{1,q}(t) z_i(t)$.

At block 1008, the weight calculator adds together the products $\tilde{x}_{1,i}(t) z_i(t)$ and $\tilde{x}_{1,q}(t) z_q(t)$, increments the result by a step $\mu_3$ and feeds the incremented results through an integrator to form a weight $w_{1,i}$.

At block 1010, the weight calculator adds together the products $\tilde{x}_{1,i}(t) z_q(t)$ and $\tilde{x}_{1,q}(t) z_i(t)$, increments the result by a step $\mu_3$ and feeds the incremented results through an integrator to form a weight $w_{1,q}$.

Figure 11:
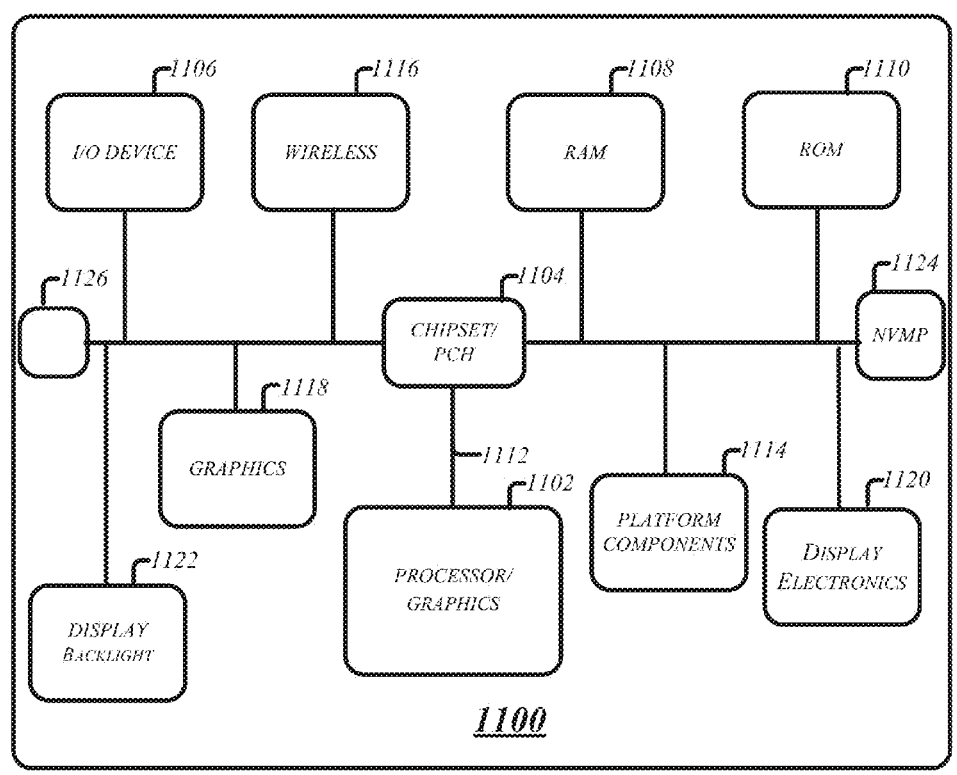
FIG. 11 depicts an embodiment of a computing system.

FIG. 11 is a diagram of an exemplary system embodiment and in particular, FIG. 11 is a diagram showing a platform 1100, which may include various elements. For instance, FIG. 11 shows that platform (system) 1110 may include a processor/graphics core 1102, a chipset/platform control hub (PCH) 1104, an input/output (I/O) device 1106, a random access memory (RAM) (such as dynamic RAM (DRAM)) 1108, and a read only memory (ROM) 1110, display electronics 1120, display backlight 1122, and various other platform components 1114 (e.g., a fan, a crossflow blower, a heat sink, DTM system, cooling system, housing, vents, and so forth). System 1100 may also include wireless communications chip 616 and graphics device 1118. The embodiments, however, are not limited to these elements.

As shown in FIG. 11, I/O device 1106, RAM 1108, and ROM 1110 are coupled to processor 1102 by way of chipset 1104. Chipset 1104 may be coupled to processor 1102 by a bus 1112. Accordingly, bus 1112 may include multiple lines.

Processor 1102 may be a central processing unit comprising one or more processor cores and may include any number of processors having any number of processor cores. The processor 1102 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1102 may be multiple separate processors located on separate integrated circuit chips. In some embodiments processor 1102 may be a processor having integrated graphics, while in other embodiments processor 1102 may be a graphics core or cores.

Figure 12:
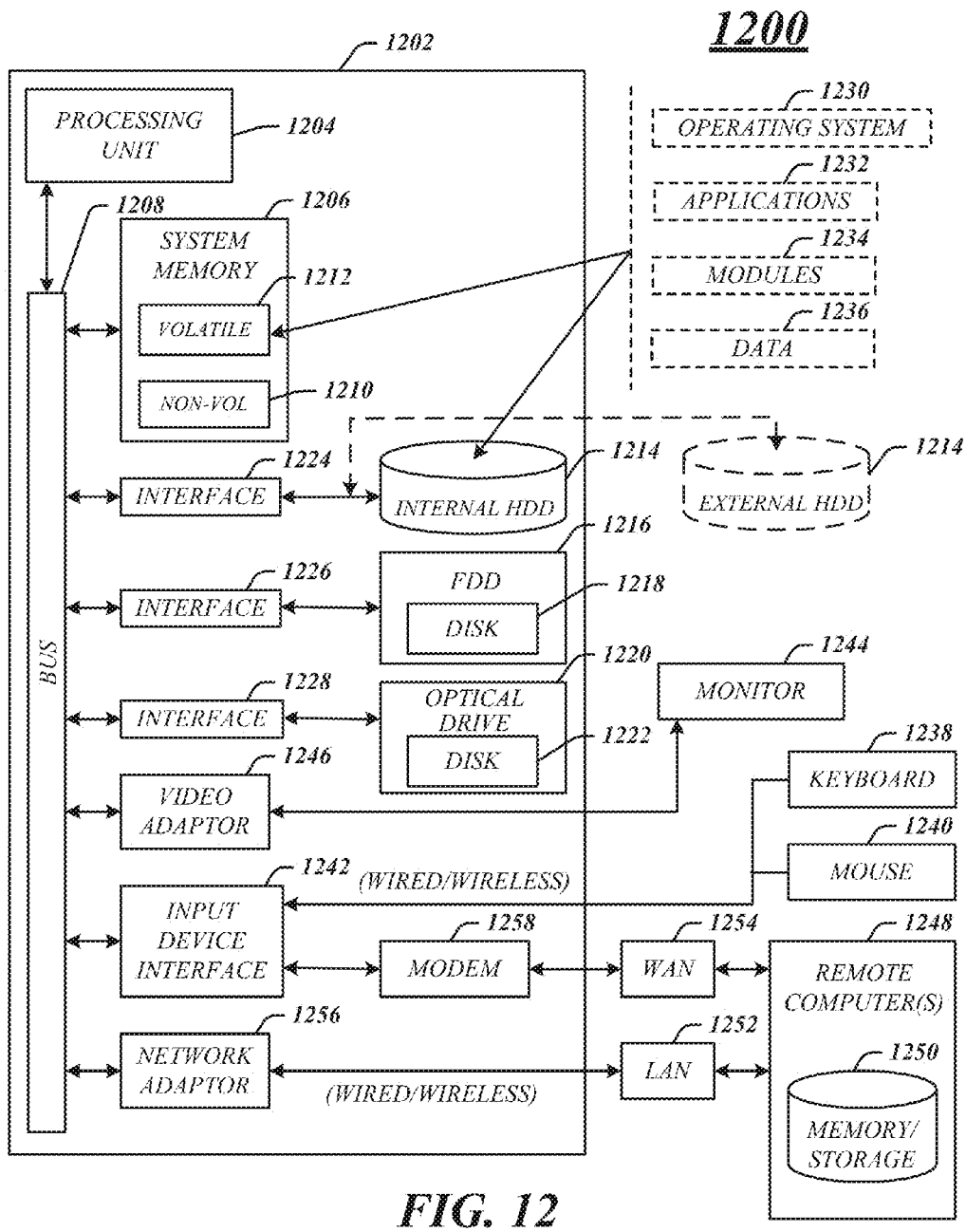
FIG. 12 illustrates one embodiment of a computing architecture.

FIG. 12 illustrates an embodiment of an exemplary computing system (architecture) 1200 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1200 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1200 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors. Dual microprocessors and other multi processor architectures may also be employed as the processing unit 1204. The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures.

The computing architecture 1200 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1212, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1294 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236.

A user can enter commands and information into the computer 1202 through one or more wire/wireless input devices, for example, a keyboard 1238 and a pointing device, such as a mouse 1240. Other input devices may include a microphone, an infra-red (IR) remote control, a joystick, a game pad, a stylus pen, touch screen, or the like. These and other input devices are often connected to the processing unit 1204 through an input device interface 1242 that is coupled to the system bus 1208, but can be connected by other interfaces such as a parallel port, IEEE 1294 serial port, a game port, a USB port, an IR interface, and so forth.

A monitor 1244 or other type of display device is also connected to the system bus 1208 via an interface, such as a video adaptor 1246. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   an antenna;
   a transceiver coupled to the antenna, the transceiver comprising:
   a receiver operative to receive a radio-frequency (RF) signal via an RF carrier over a time interval; and
   a transmitter operative to transmit an upconverted signal x(t) over the RF carrier during the time interval;
   a two-tap filter having first and second respective delays $\tau_1$ and $\tau_2$, the two-tap filter being arranged to receive the upconverted signal x(t) and generate first and second delayed upconverted signals $x(t-\tau_1)$ and $x(t-\tau_2)$, the unconverted signal x(t) to comprise a bandwidth BW, a product of the bandwidth and an absolute value of a difference of the first and second delays $BW|(\tau_1-\tau_2)|$ being less than 0.2; and
   an RF echo cancellation module coupled to the receiver and the transmitter, the RF echo cancellation module operative to generate an analog echo cancellation signal for the received RF signal based on the first and second delayed unconverted signals $x(t-\tau_1)$ and $x(t-\tau_2)$.

2. The apparatus of claim 1, the receiver comprising a multiplier operative to receive as input the received RF signal and the analog echo cancellation signal, multiply the received RF signal and the analog echo cancellation signal, and output an echo cancelled RF signal.

3. The apparatus of claim 2, the receiver comprising a low noise amplifier coupled to the multiplier, the low noise amplifier operative to receive the echo cancelled RF signal and amplify the echo cancelled RF signal.

4. The apparatus of claim 1, the RF echo cancellation module comprising a vector modulator to: receive a filtered component signal $x(t-\tau)$ of the upconverted signal to be transmitted; and output an echo cancellation signal based on a transform of the filtered component signal.

5. The apparatus of claim 1, the RF echo cancellation module comprising a weight calculator to: receive in phase and quadrature echo cancelled received signal components $z_i(t)$ and $z_q(t)$; receive in phase and quadrature downconverted transmit signals $\tilde{x}_{1,i}(t)$ and $\tilde{x}_{1,q}(t)$, respectively; add products $\tilde{x}_{1,i}(t)\, z_i(t)$ and $\tilde{x}_{1,q}(t)\, z_q(t)$ to form an in phase weight vector $w_{1,i}$; and add products $\tilde{x}_{1,i}(t)\, z_q(t)$ and $\tilde{x}_{1,q}(t)\, z_i(t)$ to form the quadrature weight vector $w_{1,q}$.

6. The apparatus of claim 5, the vector modulator comprising:
   a delay module to apply a delay to a first portion of the filtered component signal; a Hilbert transform module to output a Hilbert transform of a second portion of the filtered component signal $\hat{x}(t-\tau_1)$; a first multiplier to output a product of the delayed filtered component multiplied by the in-phase weight vector for estimating echo $w_{1,i}x(t-\tau_1)$; and
   a second multiplier to output a product of the delayed filtered component multiplied by the quadrature weight vector for estimating echo $w_{1,q}x(t-\tau_1)$.

7. The apparatus of claim 1, comprising a baseband echo cancellation module arranged to: determine a weight vector W for a two-tap Wiener filter to minimize power of a baseband echo cancelled signal Z(t) from a received signal Y(t), where $Z(t)=Y(t)-W_1X(t-\tau_1)e^{j\omega\tau_1}-W_2X(t-\tau_2)e^{j\omega\tau_2}=Y(t)X(t)$, where $W_k=W_{k,i}+jw_{k,q}$ and $W=[W_1\ W_2]^T$ and where $\tau_1$ and $\tau_2$ are delays of the two-tap Wiener filter.

8. The apparatus of claim 7, the baseband echo cancellation module arranged to update W according to $W=W+\mu X^*(t)Z(t)$, where $\mu$ equals step size.

9. The apparatus of claim 1, comprising a digital display to present information received in a received echo-cancelled signal derived from the analog echo cancellation signal.

10. A method, comprising:
receiving a radio-frequency (RF) signal Y(t) via an RF carrier over a time interval; and
generating a first echo cancellation signal to provide echo cancellation after the received RF signal Y(t) is downconverted to a baseband signal Z(t) in a baseband frequency range;
generating an upconverted signal x(t) to be transmitted over the RF carrier during the time interval;
filtering the upconverted signal x(t) using a two-tap filter comprising a first delay $\tau_1$ and second delay $\tau_2$ to generate first and second delayed upconverted signals $x(t-\tau_1)$ and $x(t-\tau_2)$, where a product $BW|(\tau_1-\tau_2)|$ is set to equal less than 0.2, where BW represents a bandwidth of the upconverted signal x(t) and $|(\tau_1-\tau_2)|$ represents an absolute value of a difference between the first and second delays $\tau_1$ and $\tau_2$; and
generating a second analog echo cancellation signal based on the first and second delayed upconverted signals $x(t-\tau_1)$ and $x(t-\tau_2)$, the second echo cancellation signal to provide echo cancellation between the upconverted signal x(t) and the received RF signal Y(t).

11. The method of claim 10, comprising:
applying a delay to a first portion of a filtered component signal;
performing a Hilbert transform on a second portion of the filtered component signal;
outputting a product of the delayed filtered component signal multiplied by an in-phase weight vector for estimating echo;
and outputting a product of the delayed filtered component signal multiplied by a quadrature weight vector for estimating echo.

12. The method of claim 10, comprising:
generating in phase and quadrature echo cancelled received baseband signal components $z_i(t)$ and $z_q(t)$, respectively;
generating in phase and quadrature downconverted transmit signals $\tilde{x}_{1,i}(t)$ and $\tilde{x}_{1,q}(t)$, respectively;
adding products $\tilde{x}_{1,i}(t)\ z_i(t)$ and $\tilde{x}_{1,q}(t)\ z_q(t)$ to form an in phase weight vector $w_{1,i}$; and
adding products $\tilde{x}_{1,i}(t)\ z_q(t)$ and $\tilde{x}_{1,q}(t)\ z_i(t)$ to form a quadrature weight vector $w_{1,q}$; and
applying $w_{1,i}$ and $w_{1,q}$ to the upconverted signal x(t).

13. At least one non-transitory computer-readable storage medium comprising a plurality of instructions that, when executed, cause a system to:
generate a transmit radio-frequency (RF) signal for transmission over an RF carrier, the transmit RF signal to be transmitted over the RF carrier during a time interval, the transmit RF signal to comprise an unconverted signal x(t);
filter the upconverted signal x(t) using a two-tap filter comprising a first delay $\tau_1$ and second delay $\tau_2$ to generate first and second delayed upconverted signals $x(t-\tau_1)$ and $x(t-\tau_2)$, where a product $BW|(\tau_1-\tau_2)|$ is set to equal less than 0.2, where BW represents a bandwidth of the upconverted signal x(t) and $|(\tau_1-\tau_2)|$ represents an absolute value of a difference between the first and second delays $\tau_1$ and $\tau_2$; and
generate an analog echo cancellation signal for a received radio-frequency (RF) signal based on the first and second delayed upconverted signals $x(t-\tau_1)$ and $x(t-\tau_2)$, the received RF signal to be received via the RF carrier over the time interval.

14. The at least one computer-readable storage medium of claim 13 comprising instructions that, when executed, cause a system to:
receive a filtered component signal of the upconverted signal to be transmitted; and output an echo cancellation signal based on a transform of the filtered component signal.

15. The at least one computer-readable storage medium of claim 13 comprising instructions that, when executed, cause a system to:
receive in phase and quadrature echo cancelled received signal components $z_i(t)$ and $z_q(t)$;
receive in phase and quadrature downconverted transmit signals $\tilde{x}_{1,i}(t)$ and $\tilde{x}_{1,q}(t)$, respectively;
add products $\tilde{x}_{1,i}(t)\ z_i(t)$ and $\tilde{x}_{1,q}(t)\ z_q(t)$ to form an in phase weight vector $w_{1,i}$; and
add products $\tilde{x}_{1,i}(t)\ z_q(t)$ and $\tilde{x}_{1,q}(t)\ z_q(t)$ to form the quadrature weight vector $w_{1,q}$.

16. The at least one computer-readable storage medium of claim 14 comprising instructions that, when executed, cause a system to:
apply a delay to a first portion of the filtered component signal;
output a Hilbert transform of a second portion of the filtered component signal;
output a product of the delayed filtered component signal multiplied by an in-phase weight vector for estimating echo;
and output a product of the delayed filtered component signal multiplied by a quadrature weight vector for estimating echo.

* * * * *